United States Patent [19]

Camara et al.

[11] 4,160,067
[45] Jul. 3, 1979

[54] MOLTEN CARBONATE FUEL CELL CORROSION INHIBITION

[75] Inventors: Elias H. Camara, Bolingbrook; Leonard G. Marianowski, South Holland; Rafael A. Donado, Chicago, all of Ill.

[73] Assignee: Institute of Gas Technology, Chicago, Ill.

[21] Appl. No.: 886,257

[22] Filed: Mar. 13, 1978

[51] Int. Cl.² .............................................. H01M 2/02
[52] U.S. Cl. ..................................... 429/16; 429/176; 429/185; 29/623.1
[58] Field of Search .......................... 429/16, 35, 36, 41, 429/46, 176, 185; 148/6, 6.27; 106/14; 427/383 D; 228/193, 196; 29/623.1

[56] References Cited

U.S. PATENT DOCUMENTS

| | | | |
|---|---|---|---|
| 3,288,647 | 11/1966 | Beigelman et al. | 429/16 |
| 3,514,334 | 5/1970 | Novack | 429/16 |
| 3,723,186 | 3/1973 | Borucka et al. | 429/46 |
| 3,847,672 | 11/1974 | Trocciola et al. | 429/46 |
| 3,867,206 | 2/1975 | Trocciola et al. | 429/35 |

*Primary Examiner*—Anthony Skapars
*Attorney, Agent, or Firm*—Thomas W. Speckman

[57] ABSTRACT

A high temperature molten carbonate fuel cell ferrous metal cell housing having about 2 to about 70 weight percent aluminum content in the cell housing surface wet seal area prior to cell operation providing corrosion inhibition during fuel cell operation.

16 Claims, 4 Drawing Figures

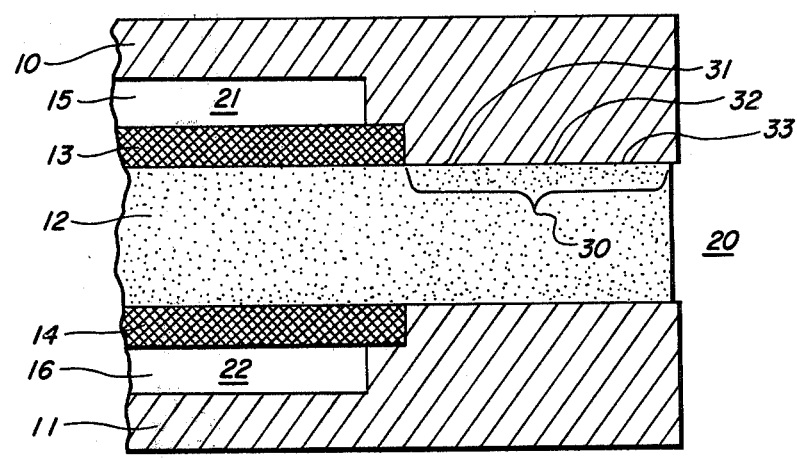

Fig. 2        ELECTROLYTE | AIR
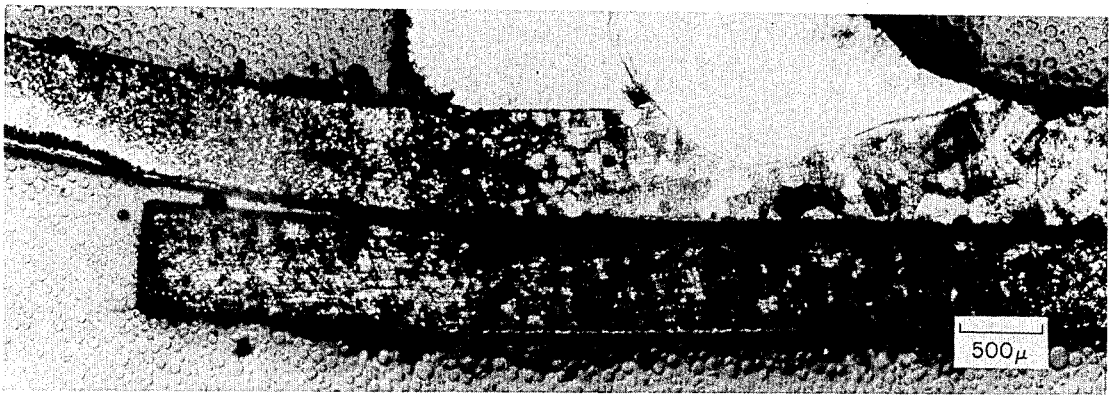
Fig. 3
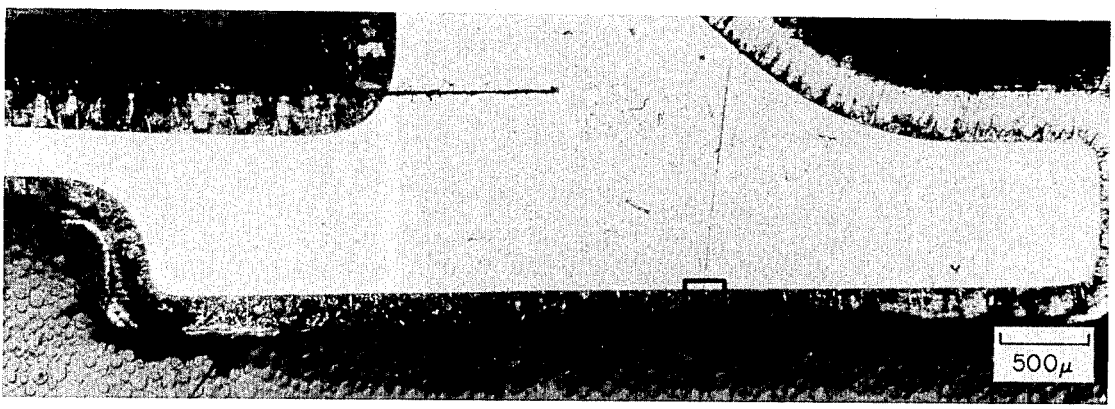
Fig. 4

MOLTEN CARBONATE FUEL CELL CORROSION INHIBITION

This invention relates to molten carbonate fuel cells and particularly to corrosion inhibition in the wet seal area of a ferrous metal cell housing in contact with the electrolyte tile comprising alkali metal carbonates and inert support material such as $LiAlO_2$. The invention more specifically relates to coating or impregnating the surface of the ferrous metal cell housing in the wet seal area with about 2 to about 70 weight percent aluminum prior to cell operation providing increased corrosion inhibition during fuel cell operation.

Molten carbonate fuel cells generally comprise two electrodes with their current collectors, a cathode and an anode, an electrolyte tile making contact with both the electrodes and a cell housing to physically retain the cell components. Under fuel cell operating conditions, in the range of about 500° to about 700° C., the entire electrolyte tile, the carbonate and the inert support material, forms a paste and thus the electrolyte diaphragms of this type are known as paste electrolytes. The electrolyte is in direct contact with electrodes and there must be gas tightness between the electrolyte and the cell housing as well as electrical insulation of one side of the cell from the other. Cell housings have been made from ferrous metals, particularly stainless steel alloys, to obtain the desired physical and strength characteristics necessary to obtain long term fuel cell operation and thermal cycling capabilities. One problem which has limited fuel cell operation times has been corrosion of the cell housing where it is in contact with the electrolyte tile thereby causing leakage and physical weakening of the structure.

Gaskets have been used in attempts to seal fuel cells and to minimize corrosion. Asbestos gaskets have been used by Dantyan and Broers (Broers, G. H. J., *High Temperature Galvanic Fuel Cells*, PhD Thesis, University of Amsterdam, Netherlands, 1958) and later mica gaskets were used by Broers (Williams, K. R., Ed., *An Introduction to Fuel Cells*, 156–181, Amsterdam: Elsevier, 1966.) Silver foil has been used as gaskets in cells with silver electrodes (Warren, D. R., *High Temperature Fuel Cells for Utilizing Cheap Conventional Fuels*, Mech. Chem. Eng. Trans. 3, (1), 81–89, May 1967).

Use of a thin aluminum sealing gasket maintained at temperatures between 400° and 600° C. sufficient to soften the aluminum without melting it and applying pressure to effect sealing action of the aluminum gasket is taught in tank type, free electrolyte cells in U.S. Pat. No. 3,514,333. We have found that such gaskets are not satisfactory for high temperature molten carbonate fuel cell operation over long periods of time. We have found that the aluminum gaskets have failed due to electrolyte creeping around the gasket, especially when the temperatures are above 650° C. and the cell is not operated under anhydrous conditions as taught in U.S. Pat. No. 3,514,333.

It is an object of this invention to provide molten carbonate fuel cells having increased corrosion inhibition in the wet seal area of the ferrous metal cell housing.

It is still another object of this invention to provide molten carbonate fuel cells which maintain high power densities necessary for a practical fuel cell over long operating periods.

It is yet another object of this invention to provide a ferrous metal fuel cell housing having increased corrosion inhibition during high temperature molten carbonate fuel cell operation thereby maintaining high physical strength characteristics of thin metal components during long term fuel cell operation.

It is yet another object of this invention to provide a method for inhibiting corrosion during fuel cell operation in the wet seal area of the cell ferrous metal housing in contact with the electrolyte tile in a molten carbonates fuel cell comprising alkali metal carbonates electrolyte and the inert support material between electrodes and operating at above about 600° C.

Other objects and advantages of the invention will become apparent from the following description taken in conjunction with the accompanying drawings showing preferred embodiments wherein:

FIG. 1 is a partial cross-sectional view through the wet seal area of a typical high temperature molten carbonate fuel cell;

FIG. 2 is a photomicrograph of the cross section of the anode wet seal area of a test cell having type 316 stainless steel cell housing;

FIG. 3 is a photomicrograph of the cross section of the anode wet seal area of a test cell having type 316 stainless steel cell housing clad with Kanthal type A-1; and FIG. 4 is a photomicrograph of the cross section of the anode wet seal area of a test cell having type 316 stainless steel cell housing with aluminum diffused surface treatment.

FIG. 1 is the cross-sectional view of the wet seal area shown schematically for a typical molten carbonates fuel cell. The cell housing is made up of anode housing 10 and cathode housing 11. Electrolyte tile 12 is between the anode and its current collector 13 and the cathode and its current collector 14, the anode and the cathode comprising the electrodes. Fuel chamber 15 holds fuel 21 and oxidant chamber 16 holds oxidant 22. The area of anode housing 10 in contact with electrolyte tile 12 adjacent anode 13 is shown as anode wet seal area 30. Anode wet seal area 30 may be divided into inner anode portion 31 adjacent anode 13, outer air portion 33 adjacent ambient air 20 and central portion 32 between inner anode portion 31 and outer air portion 33. A corresponding cathode wet seal area is present at the surface of cathode housing 11 adjacent electrolyte tile 12. It is seen from FIG. 1 that a tight gas-proof seal must be maintained between the cell housing and the electrolyte tile in the wet seal areas to provide long term cell operation and stability. Corrosion in the wet set seal areas allows leakage of gaseous reactants and loss of carbonates from the electrolyte tile and corresponding decrease in cell current. The corrosion problems are amplified due to the corrosive nature of the carbonates electrolyte and the fuel and oxidant, especially, toward ferrous metals. The inert support material may be any refractory which is chemically and physically stable in the presence of the alkali metal carbonates and thus does not have any effect upon corrosion in the wet seal area. To be economically viable, fuel cells require sheet metal components, such as cell housings and very thin components, therefore making any corrosion of the thin metal very critical. Extrapolation of the corrosion inhibition of the present invention indicates that the long lives (40,000 hours) desired for economic viability can be achieved. The sheet metal components such as cell housings, must have high structural strength characteristics and provide workability necessary to fabricate the cell.

We have found that to meet the structural requirements of physical and strength characteristics as well as meeting fabrication requirements of workability, ferrous metal cell housings are desirable for use in high temperature molten carbonate fuel cells. Such fuel cells generally operate at about 500° to about 700° C. with particularly preferred operation temperatures being in the upper portion of the range, from about 650° to 700° C. The molten carbonate fuel cell having an electrolyte tile comprising alkali metal carbonates and an alkali metal aluminate electrolyte support material together with moisture, fuel and oxidant present, as well as different metals, cause corrosive action, particularly in the wet seal areas of the cell housing. Stainless steel has desirable physical and strength characteristics as well as being desirably workable for fabrication, but does experience undesired corrosion when used as a cell housing in high temperature molten carbonate fuel cells. Corrosion at the anode wet seal area is caused by corrosion couples arising from differences in the potential between the fuel chamber, dictated by the fuel, and the oxidant chamber and ambient air, dictated by the oxidant and air, respectively. Galvanic corrosion of the anode wet seal area can also occur because of the anode housing-anode contact in presence of the alkali metal carbonates. The corrosion observed at the anode wet seal area of the anode housing is in the order of 100 times greater than that of the cathode housing in the cathode wet seal area. Thermodynamic calculations show that the fuel-oxidant couple has the maximum driving force at the anode wet seal area. Tests where all of the above corrosion couples were active have shown that corrosion of the anode wet seal area is greatest at the anode wet seal area inner anode portion indicated as 31 in FIG. 1, and is least at the anode wet seal area outer air portion shown as 33 in FIG. 1.

Test cells were operated at 650° C. for 1000 hours and samples from the wet seal areas were sectioned and microscopically analyzed. The electrodes in the cells were nickel and the cell housing stainless steel, type 316. The electrolyte tile was approximately 0.070 inch thick of lithium aluminate and the carbonates electrolyte was 62 mol percent $Li_2CO_3$ and 38 mol percent $K_2CO_3$, the eutectic composition. Two fuel gases were used. The fuel inlet gas composition was 60.9 percent $H_2$, 8.4 percent $CO_2$, 9.1 percent CO, and 21.6 percent $H_2O$, while at outlet conditions the composition was 31.5 percent $H_2$, 21.9 percent $CO_2$, 9.6 percent CO, 37 percent $H_2O$, corresponding to 37 percent $H_2$ utilization. The anode potential was potentiostatically maintained at minus 1000 mV with respect to 67 percent $CO_2$/33 percent $O_2$ gold reference electrode in the tests under load. The oxidant gas composition was 29.2 percent $CO_2$, 14.3 percent $O_2$, 2.8 percent $H_2O$ and 53.7 percent $N_2$.

FIG. 2 is a photomicrograph of the cross section of the anode housing showing wet seal area 30 from a cell operated as above under fuel inlet gas conditions using type 316 stainless steel as the anode housing.

The anode housing was sectioned and samples prepared using standard metallographic techniques. The electrolyte side is at the bottom of the photomicrograph and the fuel side at the top of the photomicrograph. The photomicrograph is marked to show the electrolyte contact area with the anode housing or the anode wet seal area toward the left and the air contact with the anode housing toward the right. It is seen that the anode wet seal area of the anode housing is severely corroded and that the corrosion is greatest in the anode wet seal area inner anode portion 31 decreasing toward the anode wet seal area outer air portion 33. At the innermost portion of the anode wet seal area inner anode portion of the anode houing it is seen that corrosion has destroyed about 50 percent of the original stainless steel thickness. Corresponding tests were conducted at open-circuit potential with fuel inlet gas atmosphere and much less corrosion at the same sites was observed when the fuel-oxidant couple does not operate. Under the open circuit test conditions, corrosion of the anode wet seal is maximum in the anode wet seal area outer air portion and decreases toward the anode wet seal area inner anode portion.

Corrosion of type 316 stainless steel anode housing in the anode wet seal area according to the above tests, is summarized in Table I.

TABLE I

| Wet Seal Area | Corrosion in mm/1000 hours | |
|---|---|---|
| | Open Circuit Potential | Load |
| Inner anode portion | 0.035 – 0.040 | 0.47 – 0.62 |
| Outer air anode portion | 0.080 – 0.110 | 0.15 – 0.20 |
| Cathode | 0.007 – 0.010 | 0.007 – 0.010 |

At fuel-outlet gas conditions corrosion under load testing was found to be even more severe, in the order of 0.970 mm/1000 hours. Therefore, with leaner fuel gas compositions (lower $H_2$ content) the corrosion can be expected to be even more severe. It is clear that the corrosion problems encountered in the anode wet seal area are much more severe than at the cathode wet seal area and therefore, attention is directed to inhibition of corrosion under fuel cell operating conditions in the anode wet seal area.

According to the present invention, we have found that when the surface of a ferrous metal cell housing comprises about 2 to about 70 weight percent aluminum, corrosion in the wet seal area in contact with the electrolyte tile comprising alkali metal carbonates and the inert support material of a high temperature molten carbonate fuel cell operating at about 500° to 700° C. is greatly improved. The aluminum may be applied to the ferrous metal surface by any suitable means such as metal claddings by using a ferrous metal alloy containing the desired aluminum or by modifying the metal surface by hot dipping, plasma spraying, electroplating, electroless plating and metal diffusion techniques. The surface treatment must be such that the aluminum containing surface portion effectively isolates the ferrous base metal which does not contain substantial amounts of aluminum from the surface area. Ferrous metals having only a few percent aluminum throughout do not provide necessary physical properties for use as molten carbonate fuel cell housings.

One ferrous metal alloy containing principally Fe and Cr and about 2 to about 6 weight percent aluminum suitable for cladding cell housings is marketed under the name "Kanthal" by the Kanthal Corporation, Bethel, Connecticut. Specific Kanthal compositions suitable for use as claddings for cell housings of this invention include:

TABLE II

| | Weight Percent | | | |
|---|---|---|---|---|
| | Al | Cr | Co | Fe |
| Type A-1 | 5.5 | 22 | .5 | 72 |

TABLE II-continued

|  | Weight Percent | | | |
| --- | --- | --- | --- | --- |
|  | Al | Cr | Co | Fe |
| Type A | 5 | 22 | .5 | 72.5 |
| Type D | 4.5 | 22 | .5 | 73 |

A fuel cell test was conducted as described above using an anode housing having the type 316 stainless steel clad with Kanthal Type A-1 in the wet seal area. The Kanthal cladding was welded to the stainless steel anode housing and the cell operated under load at fuel-inlet conditions for 1000 hours as described above. Visual examination of the Kanthal clad wet seal area revealed no areas of localized corrosion. During the test, the cell was accidentally operated at temperatures as high as 850° C. for 8 to 15 hours during which corrosion might be expected to be accelerated by the higher temperature. The extent of corrosion is almost uniform as shown in FIG. 3 from the inner to the outer portion of the wet seal area and in 1000 hours testing a total of 0.02 mm corrosion was observed. FIG. 3 shows that corrosion under fuel cell operating conditions was greatly inhibited in the Kanthal clad stainless steel anode housing wet seal area. The orientation of FIG. 3 is the same as described above for FIG. 2.

Another anode housing was fabricated using type 316 stainless steel having aluminum diffused into the stainless steel surface to form an iron-aluminum alloy. The 316 stainless steel was treated by the Alonizing process as available from Alon Processing, Inc., Grantham Street, Tarentum, Pennsylvania. The photomicrograph of the anode housing in the wet seal area having aluminum diffused into its surface for 0.25 mm is shown in FIG. 4, oriented the same as described above for FIG. 2, after 5000 hours of testing under molten carbonate fuel cell operating conditions as described above. The concentration of aluminum is highest at the surface, about 60 percent aluminum, and is lowest at the innermost portion of the penetration, about 10 percent aluminum. The photomicrograph shows very clearly the aluminum penetrated surface, which as shown in FIG. 4, provides high corrosion inhibition. The corrosion observed in FIG. 4 was 0.02 to 0.03 mm in the 5000 hour test. In the case of the aluminum surface treatment of type 316 stainless steel by the Alonizing method, the concentration of aluminum appeared to be maintained at the surface without continued diffusion of aluminum into the base metal under the temperature conditions of molten carbonate fuel cell operation.

Corrosion in the anode wet seal area is more severe when a ternary $Li_2CO_3$-$K_2CO_3$-$Na_2CO_3$ electrolyte is used. The anode wet seal corrosion in both the lithium-potassium and lithium-sodium carbonates binary electrolyte is less than in the ternary electrolyte.

It is seen from the above tests that when using a ferrous metal cell housing such as stainless steel in contact with the electrolyte tile comprising alkali metal carbonates and the inert support material in a high temperature molten carbonate fuel cell operating at about 500° to 700° C., preferably from about 650° to 700° C., corrosion is greatly inhibited when the cell housing surface in the wet seal area comprises about 2 to about 70 weight percent aluminum prior to fuel cell operation. The content of aluminum in the ferrous metal housing is specified prior to cell operation since under oxidizing conditions at least some of the aluminum present may be oxidized to form aluminum oxide and/or reacted with the electrolyte to form an alkali metal aluminate. The extent of such reactions is not presently known. Cell housing surfaces in the wet seal area according to this invention provide corrosion inhibition independent of the fuel and oxidant gas compositions, the cell potential and electrolyte compositions of of molten carbonate fuel cells.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. Ferrous metal cell housing for use in high temperature molten carbonate fuel cells having an anode and a cathode ferrous metal cell housing defining a fuel chamber and an oxidant chamber, respectively, and separated by an electrolyte tile, the peripheral portion of said housings having a wet seal area surface in contact with said electrolyte tile comprising alkali metal carbonates and inert support material and operating at about 500° to about 700° C., said cell housing surface in the wet seal area comprising about 2 to about 70 weight percent aluminum prior to cell operation providing corrosion inhibition during fuel cell operation.

2. The ferrous metal cell housing of claim 1 wherein said housing is an anode housing.

3. The ferrous metal cell housing of claim 2 wherein said aluminum in the anode wet seal area is provided by metal cladding comprising about 2 to about 6 weight percent aluminum in a ferrous metal alloy.

4. The ferrous metal cell housing of claim 3 wherein Kanthal cladding is attached to stainless steel alloy base ferrous metal cell housing.

5. The ferrous metal cell housing of claim 2 wherein said aluminum in the anode wet seal area is provided by surface treatment of said ferrous metal whereby aluminum is diffused into the ferrous metal.

6. The ferrous metal cell housing of claim 5 wherein aluminum is diffused into stainless steel, said surface treatment providing about 10 to about 70 percent aluminum concentration.

7. The ferrous metal cell housing of claim 1 providing corrosion inhibition under cell operating conditions of above about 600° C.

8. The ferrous metal cell housing of claim 7 wherein said cell operating conditions are above about 650° C.

9. A method for inhibiting corrosion of ferrous metal housings defining a fuel chamber and an oxidant chamber separated by an electrolyte tile, the peripheral portion of said housings having a wet seal area surface in contact with an electrolyte tile comprising alkali metal carbonates and an inert support material and operating during fuel cell operation at about 500° to about 700° C., comprising providing in said cell housing surface wet seal area about 2 to about 70 weight percent aluminum prior to cell operation.

10. The method of claim 9 wherein said housing is an anode housing.

11. The method of claim 10 wherein said aluminum in the anode wet seal area is provided by metal cladding comprising about 2 to about 6 weight percent aluminum in a ferrous metal alloy.

12. The method of claim 11 wherein Kanthal cladding is attached to stainless steel alloy base ferrous metal cell housing.

13. The method of claim 10 wherein said aluminum in the anode wet seal area is provided by surface treatment of said ferrous metal whereby aluminum is diffused into the ferrous metal.

14. The method of claim 13 wherein aluminum is diffused into stainless steel, said surface treatment providing about 10 to about 70 percent aluminum concentration.

15. The method of claim 9 providing corrosion inhibition under cell operating conditions of above about 600° C.

16. The method of claim 15 wherein said cell operating conditions are above about 650° C.

* * * * *